United States Patent [19]

Ångquist

[11] Patent Number: 5,051,684
[45] Date of Patent: Sep. 24, 1991

[54] THREE-PHASE VOLTAGE STIFF CONVERTOR

[75] Inventor: Lennart Ångquist, Enköping, Sweden

[73] Assignee: Asea Brown Boveri AB, Västeras, Sweden

[21] Appl. No.: 638,329

[22] Filed: Jan. 7, 1991

[30] Foreign Application Priority Data

Jan. 5, 1990 [SE] Sweden ............................. 9000041

[51] Int. Cl.$^5$ ............................................. G05F 1/70
[52] U.S. Cl. ................................... 323/207; 323/205; 363/71; 363/72; 307/82
[58] Field of Search ................... 323/207, 205; 363/71, 363/72; 307/82

[56] References Cited

U.S. PATENT DOCUMENTS 3,671,846 6/1972 Corey ..................................... 363/43
4,009,433 2/1977 Moltgen ............................. 323/102
4,063,143 12/1977 Forstbauer ............................ 363/40

FOREIGN PATENT DOCUMENTS

1513913 12/1969 Fed. Rep. of Germany .
1372467 7/1988 U.S.S.R. .

Primary Examiner—Steven L. Stephan
Assistant Examiner—Adolf Berhane
Attorney, Agent, or Firm—Pollock, Vande Sande & Priddy

[57] ABSTRACT

A three-phase voltage stiff convertor (SR) has two six-pulse partial convertors (SR1, SR2). The alternating voltage terminals of the partial convertors are connected to a transformer (TR) with the aid of which the resultant alternating voltage of the converter is formed as the difference between the alternating voltages of the partial convertors. Each partial converter has a separate direct voltage source (C1, C2). The converter has control members (SD) which control the two partial convertors which a mutual phase displacement alternating between +150° and −150°.

17 Claims, 6 Drawing Sheets

THREE-PHASE VOLTAGE STIFF CONVERTOR

TECHNICAL FIELD

The present invention relates to a three-phase voltage-stiff convertor comprising a first and a second six-pulse voltage-stiff partial convertor, each partial convertor having alternating voltage terminals and direct voltage terminals, in which the partial convertors operate phase-shifted in relation to each other, the alternating voltage terminals of the partial convertors being connected to a transformer for forming the alternating voltage of the convertor by a combination of the alternating voltages of the partial convertors, and the direct voltage terminals of each partial convertor being connected to a direct voltage source.

BACKGROUND ART

A voltage stiff convertor is a self-commutated convertor, the direct voltage of which, at least in the short run, is substantially constant. This can be achieved, for example, with the aid of a capacitor bank connected to the direct voltage terminals of the convertor. Such a convertor may be used for reactive power compensation of an a.c. network. The convertor is then connected via a small inductance to the a.c. network, and the inductance may consist of the leakage inductance of a transformer connected between the convertor and the network. The reactive power flow between the convertor and the network may be controlled by variation of the amplitude of the alternating voltage of the convertor. Any active power flow between the convertor and the network may be controlled by variation of the phase angle between the alternating voltages of the convertor and the network.

To reduce unwanted effects on the network from the convertor, it is desirable that the alternating voltage of the convertor exhibit a good curve shape, that is, is relatively free from harmonics. One way to reduce the harmonic content of the alternating voltage is to carry out a so-called pulse width modulation of the convertor. The large number of commutations per period in such a convertor, however, gives rise to high losses, which makes such a convertor less suitable at high power ratings.

Another way of obtaining an improved curve shape is to increase the pulse number of the convertor, that is, the number of commutations per alternating voltage period. A three-phase convertor in its simplest form has the pulse number 6. A considerable improvement of the curve shape may be obtained by doubling the pulse number of the convertor. This can be obtained in a known manner by so-called twelve-pulse connections in which the voltages from two phase-shifted six-pulse convertors are combined. There are two main types of twelve-pulse connections. In a first known connection of this kind, two separate transformers are required and therefore the equipment is complicated and expensive. In the second known convertor connection of this kind, only one transformer is used but the connection has the disadvantage that circulating current will flow between the two six-pulse convertors. Special measures in the form of increased leakage reactance of the transformer or in the form of separate inductors are required to limit these circulating currents, which causes an increased complication of the convertor. Further, the circulating currents, which cannot be entirely eliminated, give rise to additional losses in the convertors and require overdimensioning thereof.

A further way of achieving an improved curve shape is using the so-called double six-pulse connection. In this case only one single transformer is used, with an open winding for connection to two six-pulse convertors with a common direct voltage source. By an open winding is meant a winding in which both ends of each phase winding are accessible for connection externally. Each phase winding has one of its ends connected to an alternating voltage terminal of one partial convertor and its other end connected to the corresponding alternating voltage terminal of the other partial convertor. The three phases at one end of the winding system now mentioned may be considered to constitute a first three-phase system and the three phases at the other end of the winding system may be considered to constitute a second three-phase system. The difference between these two voltage systems constitutes the voltage system that is applied to the transformer. However, this known connection has the disadvantage that a zero-sequence voltage is applied to the transformer, which zero-sequence voltage will then be supplied to that alternating voltage network to which the convertor plant is connected. This zero-sequence voltage may be limited by providing the convertor plant with a zero-sequence inductor, which absorbs the zero-sequence voltage. However, such an inductor entails a considerable complication of the plant and renders it more expensive. According to another method, the transformer may be provided with an extra unwound leg, the transformer thus operating as a zero-sequence inductor. However, this entails a complication of the transformer of some significance. Further, in such a transformer the transformer winding, connected to the network, cannot be grounded at its star point, which means that the winding has to be fully insulated and thus renders the transformer expensive.

Figure 1:
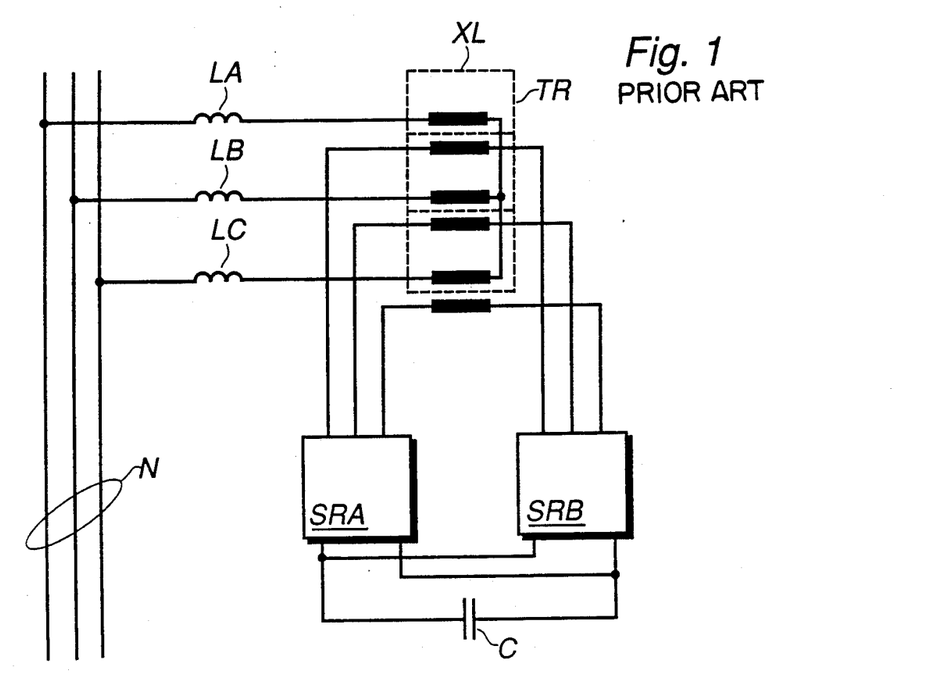
FIGS. 1 and 2 show two prior art so-called double six-pulse connections.

A so-called double six-pulse connection of one of the two types mentioned above is shown in FIG. 1. The two six-pulse convertors SRA and SRB are connected on their direct voltage sides to a common direct voltage source, which consists of a capacitor bank C. The alternating voltage sides of the convertors are connected, via a transformer TR and inductors LA, LB, LC, to a three-phase network N. The convertors are controlled such that their alternating voltages are displaced in phase approximately 150°. The transformer has an extra unwound leg XL.

Figure 2:
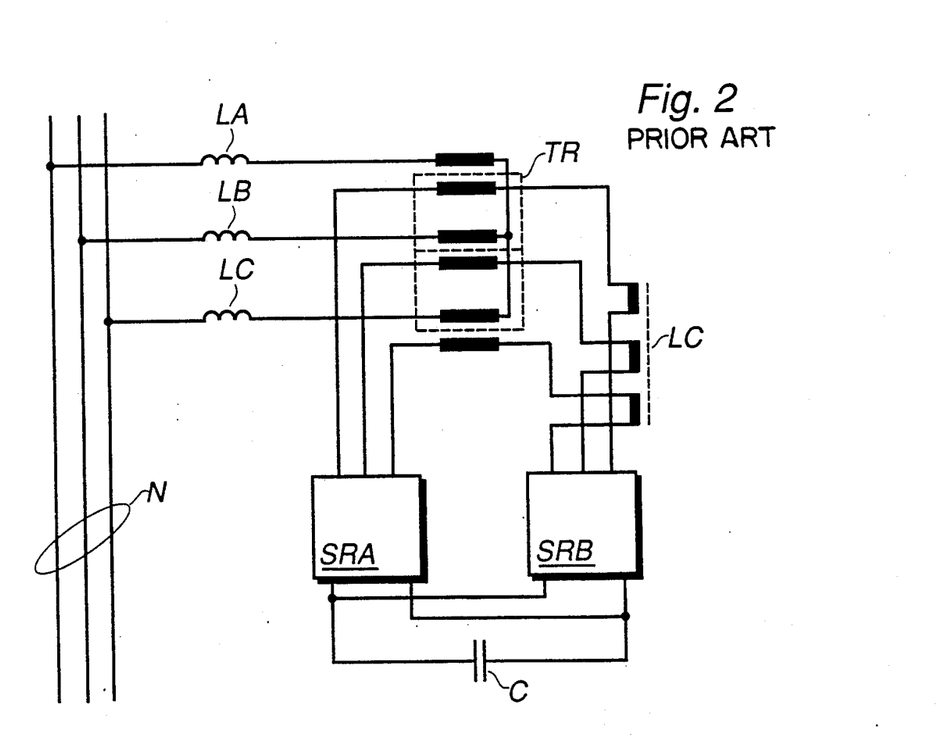

A double six-pulse connection of the second of the two types mentioned above is shown in FIG. 2. It has a zero-sequence inductor LC with three phase windings on a common core.

A third known way of obtaining a twelve-pulse function and hence an improved curve shape is by using a so-called NPC-type convertor (NPC = Neutral Point Clamped). However, such a convertor has a more complicated main circuit and comprises more semiconductor components than a traditional double six-pulse or twelve-pulse connection. Further, in such a convertor certain of the semiconductor components are loaded more severely than the others, which for a certain given load requires an overdimensioning of the first-mentioned semiconductor components and hence makes the convertor more expensive or reduces its maximum power.

In all of the known cases mentioned above, thus, a reduction of the harmonics is obtained at the cost of increased losses and/or considerable complications of either the transformer or the convertor.

SUMMARY OF THE INVENTION

The invention aims to provide a convertor of the kind mentioned in the introductory part of the specification, in which
simple six-pulse bridges may be used,
a conventional, simple three-limb transformer may be used,
the star point of the network winding of the transformer may be grounded, which reduces the demands for insulation of the transformer,
a good curve shape may be obtained with low commutating frequency and hence low convertor losses.

What characterizes a convertor according to the invention will be clear from the appended claims.

In the following the invention will be described with reference to the accompanying FIGS. 1–9.

DESCRIPTION OF THE PREFERRED EMBODIMENTS

Figure 3:
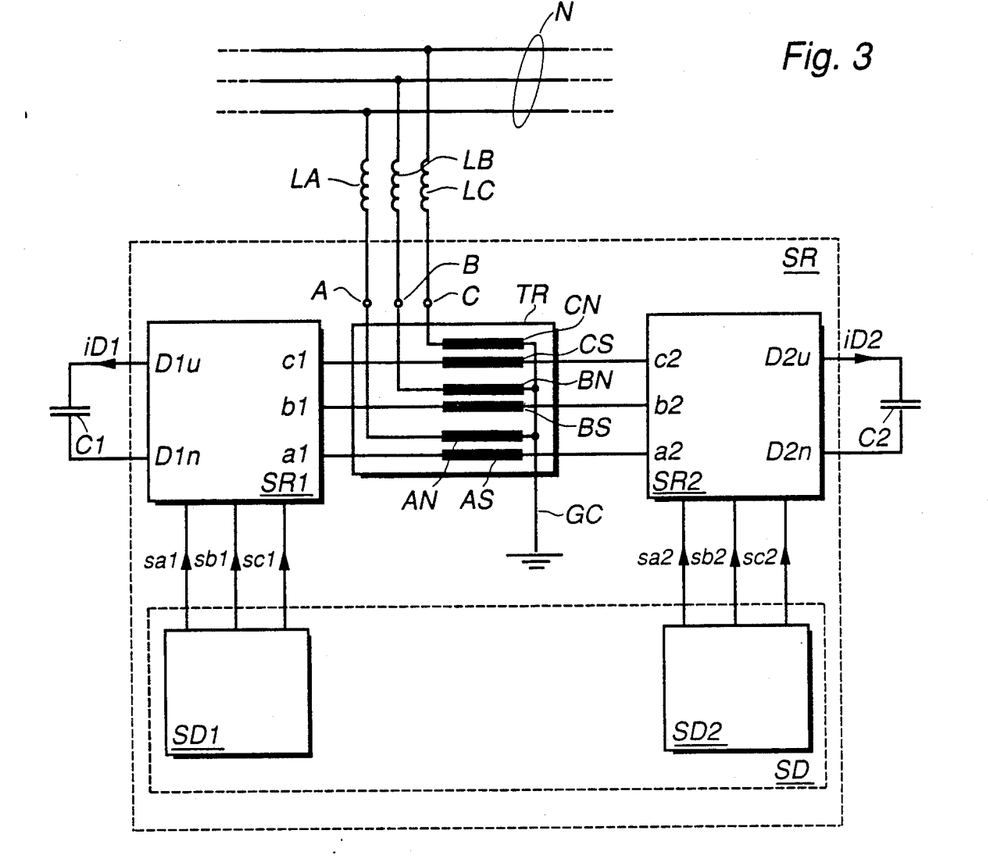
FIG. 3 shows an embodiment of a convertor according to the invention for reactive power compensation of an alternating voltage network.

FIG. 3 shows a convertor SR according to the invention, which via inductors LA, LB, LC is connected to a three-phase alternating voltage power network N. The convertor is intended to be used for reactive power compensation of the network, whereby is meant that the convertor may generate or consume a variable reactive power, for example for increasing the power factor of the network or for controlling the voltage of the network. The inductors just mentioned lie in series with the leakage reactances of the convertor transformers and may be omitted if the latter are sufficiently large. The convertor comprises two self-commutated voltage stiff convertors SR1 and SR2, which consist of six-pulse bridges, a transformer TR and a control device SD. Each partial convertor has alternating voltage terminals a1, b1, c1 and a2, b2, c2, respectively. To the direct voltage terminals D1u and D1n of the partial convertor SR1, a first capacitor bank C1 is connected, and to the direct voltage terminals D2u and D2n of the partial convertor SR2, a second capacitor bank C2 is connected. In a manner which will be described below the capacitors C1 and C2 are maintained charged to a suitable voltage and constitute separate and galvanically separate direct voltage sources, one for each partial convertor. The transformer TR has a convertor winding with three phase windings AS, BS and CS as well as a star-connected network winding with the three-phase windings AN, BN and CN. The transformer has a terminal GC, connected to the star point of the network winding, for grounding of the network winding as well as connections A, B, C for connection to the network N. Each one of the three phase windings AS, BS, CS is connected, with one of its ends, to an alternating voltage terminal in one of the partial convertors and, with its other end, to the corresponding alternating voltage terminal in the other convertor.

The convertor has a control system SD for control of the function of the convertor. In FIG. 3 only the control pulse devices SD1 and SD2 are shown, which deliver control pulses sa1, sb1, sc1 to the convertor SR1 and sa2, sb2, sc2 to the convertor SR2.

Figure 4:
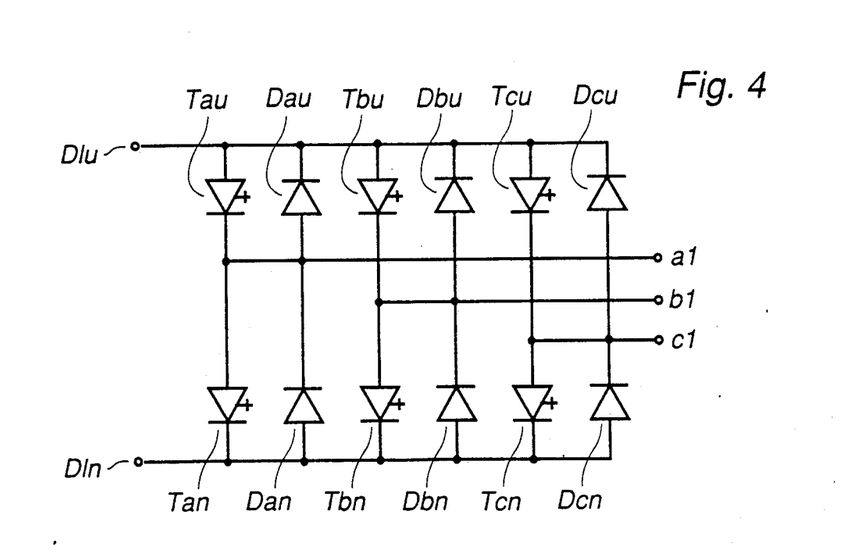
FIG. 4 schematically shows the configuration of the main circuit of one of the two partial convertors in FIG. 3.

FIG. 4 shows the configuration of the partial convertor SR1. The partial convertor SR2 is built up in identically the same way. Each phase of the convertor has two series-connected semiconductor valves, for example Tau and Tan. As shown in FIG. 4, these may be built up as turn-off thyristors (so-called GTO thyristors). Alternatively, the valves may be built up of non-turn-off thyristors, which are then provided with quenching circuits, or possibly of transistors or other controllable valves. Each valve may consist of a plurality of series-connected semiconductor elements. In antiparallel with each valve, a bypass diode, Dau, Dan, is arranged. The diode may be integrated with the controllable semiconductor element. The point of connection of the valves and the diodes is connected to the alternating voltage terminal a1 of the convertor. The other two phases are built up in the same way. The two valves in the same phase are controlled such that one valve is always conducting and the other valve is non-conducting. The three phases are controlled with a mutual phase displacement of 120°, a three-phase voltage system thus being generated on the alternating voltage terminal a1, b1, c1 of the convertor.

Each partial convertor generates a six-pulse three-phase voltage system. The difference between these two systems is applied across the convertor winding of the transformer. If the partial convertors lie in phase, the difference voltage and hence the transformer voltage will be zero. If the partial convertors are controlled such that they operate with a 180° phase displacement, a six-pulse voltage with an amplitude twice as large as the voltage of each partial convertor is applied across the transformer. However, according to the invention, the partial convertors are controlled such that their phase displacement is +150° or −150°, whereby a twelve-pulse voltage with a low harmonic content occurs across the transformer.

The above-mentioned phase displacement between the two partial convertors means that at least one of the partial convertors must operate with a phase displacement relative to the network which deviates from the values of the phase displacement, 0° and 180°, at which the flow of active power between the network and the partial convertor is zero. This means that the capacitor bank of at least one of the convertors will be continuously charged or discharged, which would make steady-state operation impossible. In the convertor according to the invention, this is solved by constantly reversing the sign of the phase displacement between the partial convertors during operation.

Figure 5A:
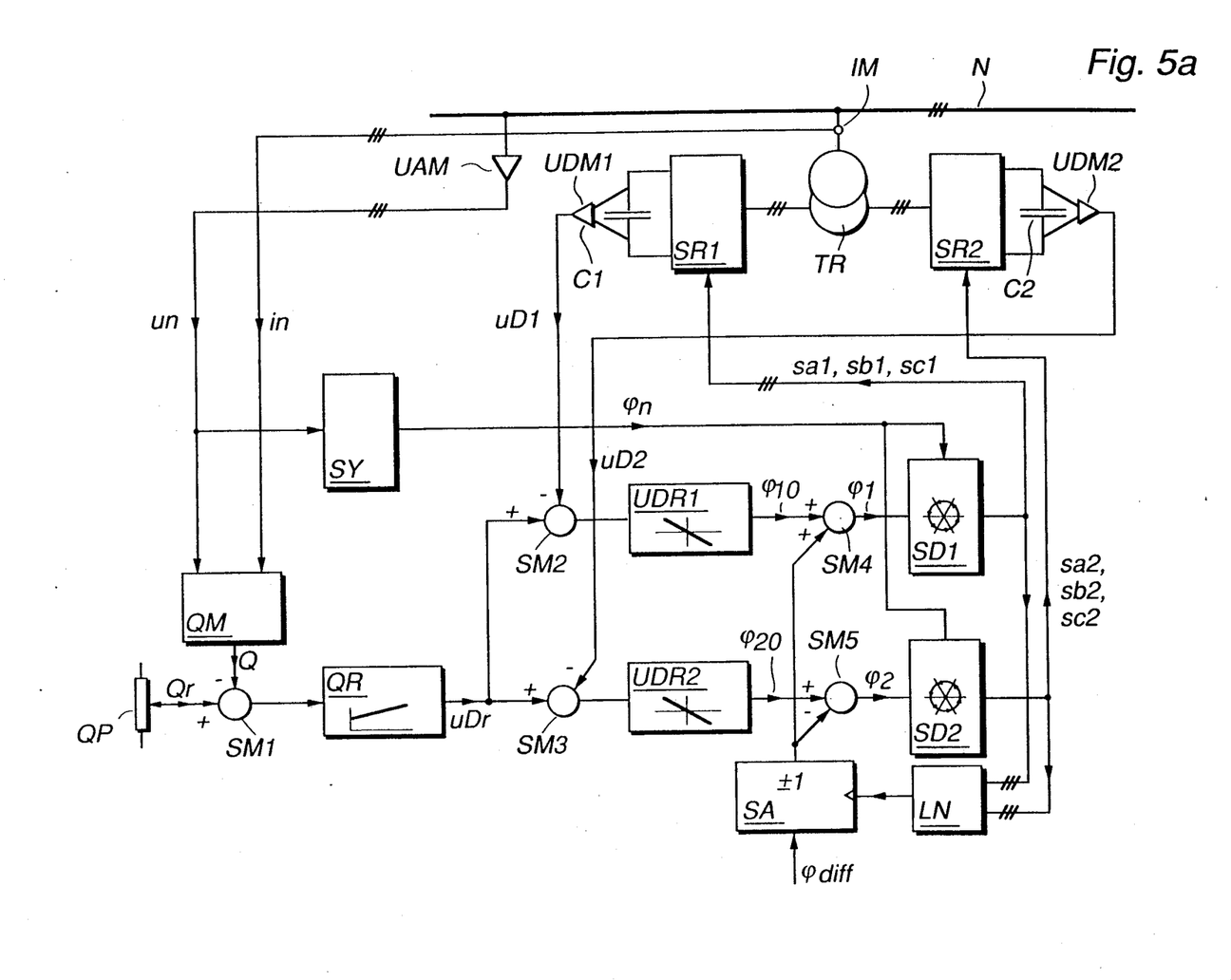
FIGS. 5a and 5b show, in the form of block diagrams, the configuration of the control system in the convertor according to FIG. 3.

FIG. 5a shows the control system for the convertor according to FIG. 3. Each partial convertor has a control pulse device, SD1 and SD2, respectively, which in a known manner deliver control pulses to the inverters. The line voltage is sensed with the aid of a voltage measuring device UAM, for example a voltage transformer, and is supplied to a synchronizing device SY which delivers a synchronizing signal φn which is a measure of the phase position of the line voltage and which, in the absence of additional control signals from the control system, keeps the two control pulse devices in such phase positions relative to the line voltage that, for one thing, the partial convertors operate in opposition and, for another, the alternating voltage of the convertor (the difference between the voltages of the partial convertors) lies in phase with the a.c. voltage of the network.

The voltage un from the voltage measuring device UAM is supplied to a reactive power forming member QM. To this member is also fed a signal in which corresponds to the convertor current and which is obtained with the aid of a current measuring device IM arranged between the convertor and the network. The measuring device QM forms a signal Q which is proportional to the reactive power flowing between the convertor and the network and which is supplied to a summator SM1. To the summator is also fed a reference value Qr for the reactive power which is obtained with the aid of a reference value transducer QP. The difference between the signals QR and Q is supplied to a reactive power regulator QR with PI characteristic. The output signal uDr from the regulator constitutes a reference value for the direct voltage of the two capacitors C1 and C2. The capacitor voltages are sensed with the aid of voltage measuring devices UDM1 and UDM2 and are supplied to summators SM2 and SM3, where they are compared with the reference value uDr. The difference signals obtained with the aid of the summators are supplied to direct voltage regulators UDR1 and UDR2 with P-characteristic. The output signals φ10 and φ20 of the regulators are supplied to summators SM4 and SM5, the output signals φ1 and φ2 of which are supplied to the two control pulse devices SDI and SD2. When the signals φ1 and φ2 are zero, the two partial convertors operate in opposition, that is, each commutation in one partial convertor is phase displaced 180° in relation to the corresponding commutation in the other partial convertor. Further, within each partial convertor, in this case, the three phases are mutually phase-displaced 120° and the two valves in the same phase are 180° phase displaced. Further, the phase position is such that the resultant alternating voltage of each convertor lies in phase with the line alternating voltage, and therefore no active power flows between the network and the convertors. Since the convertors lie in opposition, the resultant alternating voltage, as mentioned above, is a six-pulse voltage, that is, has a relatively high harmonic content.

A positive value of the signal φ1 or φ2 phase-advances (locates at an earlier stage) the control pulses from the corresponding control pulse devices and hence the commutations in and the alternating voltage from the corresponding partial convertor. In a corresponding way, a negative value of the signal φ1 or φ2 locates at a later stage (phase-retards) the control pulses from the corresponding control pulse device.

A quantity φdiff, which corresponds to a phase displacement of 15°, is supplied to a switchable sign reverser SA. The output signal from this is supplied to the summator SM4 with a positive sign and to the summator SM5 with a negative sign. If the output signal from the sign reverser is positive, the commutations in the convertor SRI are thus phase-advanced 15°, and the commutations in the convertor SR2 are phase-retarded 15°. The opposite is the case if the output signal of the sign reverser has a negative sign. The control pulses from the control pulse devices SD1 and SD2 are supplied to a logical network LN, which delivers an output pulse when the output signals of the two partial convertors constitute the inverses of one another. The output pulses from the network LN are supplied to the sign reverser SA, which is changed over at each output pulse from the network LN.

Figure 5B:
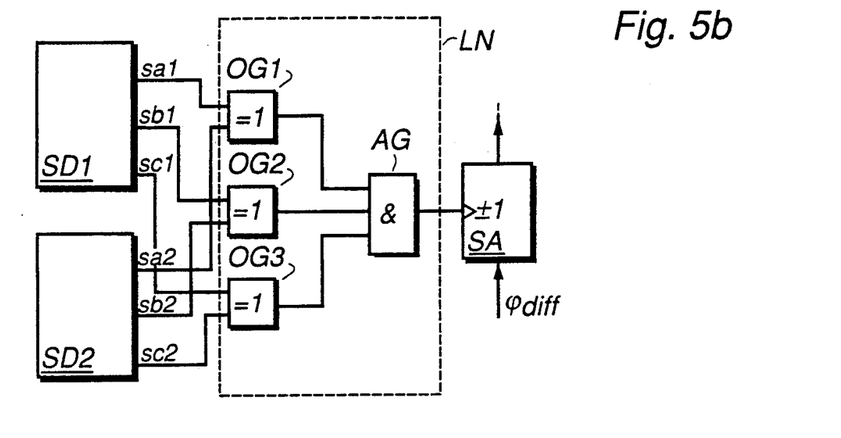

The logical network LN in FIG. 5a is built up in the manner shown in FIG. 5b. It comprises three exclusive OR gates OG1, OG2, OG3 and an AND gate AG. Each OR gate delivers an output signal if its two input signals are mutually different. Each positive flank of the output signal from the AND gate AG switches the sign reverser SA. If the control signals sa1 and sa2 are different an output signal is obtained from the gate OGl, if sb1 and sb2 are mutually different an output signal is obtained from OG2, and if sc1 and sc2 are different an output signal is obtained from OG3. A control vector for the partial convertor SRI is defined by the quantities sa1, sb1, sc1, and a control vector for the convertor SR2 is defined by the quantities sa2, sb2, sc2. One of the control vectors is the inverse of the other if sa1 $\neq$ sa2 and sb1 $\neq$ sb2 and sc1 $\neq$ sc2, and when this is the case output signals are obtained from all three OR gates and an output signal is obtained from the AND gate AG to the sign reverser to bring about a sign reversal.

In steady state, the reactive power Q corresponds to the desired one (Qr). The output signal from the reactive power regulator QR is therefore constant and equal to that value of the capacitor voltages which provides the desired reactive power. Further, the two capacitor voltages are equal to the reference value uDr obtained from the reactive power regulator, and the signals φ10 and φ20 are both zero. At a certain instant the output signal from the sign reverser SA is positive. The next commutation will therefore be phase-advanced by 15° in the convertor SR1 and phase-retarded by 15° in the convertor SR2, that is, the commutations will take place with a 30° phase displacement. During this commutation the sign reverser is changed over, and φ1 and φ2 change signs. The next commutation will therefore be phase-retarded by 15° in the convertor SRI and phase-advanced by 15° in the convertor SR2. In this way the two partial convertors will operate with a mutual phase displacement which is alternately +150° and −150°. A commutation will take place in one of the partial convertors each 30° and the resultant alternating voltage of the convertor becomes a twelve-pulse voltage with a low harmonic content. Each partial convertor will alternately be 15° phase-advanced and 15° phase-retarded, respectively, in relation to that phase position in which the active power flux is zero. This means that power will alternately flow out of the capacitor of the partial convertor and into the same capacitor. With the control principle now described, however, the mean value of this current will be zero, that is, the capacitor charge is constant.

Figure 6:
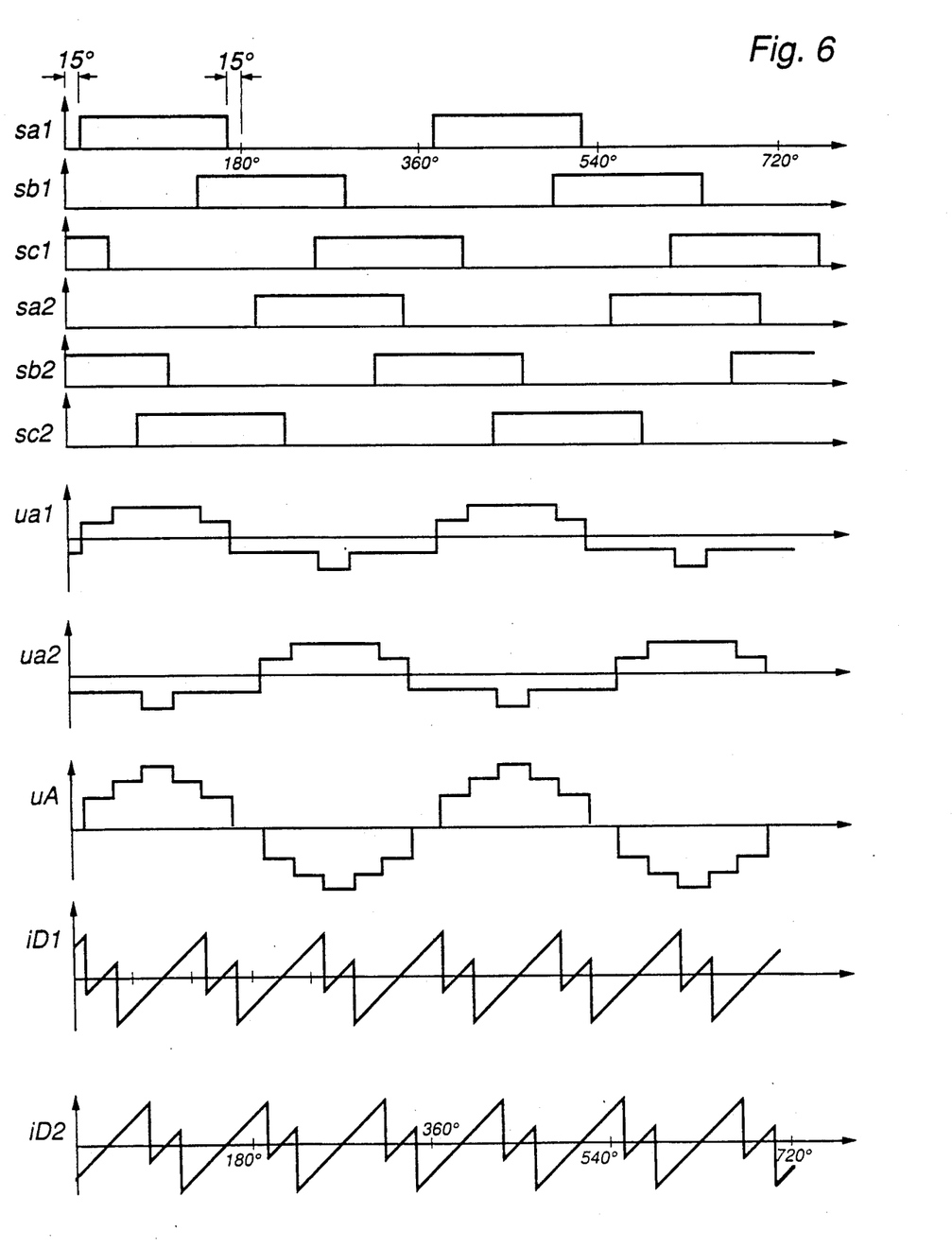
FIGS. 6 and 7 show, in connection with two alternative control methods, the curve shapes of some of the electrical quantities occurring in the convertor according to FIG. 3.

The six uppermost curves in FIG. 6 show the control pulses to the partial convertors. When a control pulse is "1", the upper valve in the corresponding phase is conducting, and when a control pulse is "0", the lower valve in the phase is conducting. Below this, in FIG. 6, the phase voltages ua1 and ua2 of the two partial convertors are shown as an example. Below this, the resultant alternating voltage belonging to the phase A is shown, which alternating voltage constitutes the difference between the voltages ua1 and ua2. At the bottom in FIG. 6, the two currents in iD1 and iD2 flowing to the capacitor banks are shown.

By influencing the phase position of the control pulses to the convertor SRI and hence the flux of active power and the capacitor current iD1, the closed control circuit formed from the units UDM1, SM2, UDR1, SDI and SRI will continuously maintain the voltage of the capacitor C1 equal to the reference value uDr. In a corresponding way, the voltage of the capacitor C2 will be maintained equal to the same reference value. The superordinate circuit for control of the reactive power comprises the units QM, QP, SMI and QR. Thus, for example, an increase of the reference value QR will give rise to an increase of the voltage reference uDr and hence—in the manner described above—an increase of the capacitor voltages and hence of the total output voltage amplitude of the convertor until the flux of reactive power Q from the convertor corresponds to the reference value QR.

The influence on the control of the partial convertors caused exerted by the above-mentioned control circuits is preferably small and does not affect the previously described fundamental mode of operation of the convertor.

In the above-described embodiment of the invention, as will be clear from FIG. 6, the conduction intervals for the upper semiconductor valve in each phase are shorter than the conduction intervals for the lower valve in the same phase. The latter valve will therefore be subjected to a stronger thermal load, which reduces the maximum power of the convertor. The starting state of the sign reverser SA decides which of the valves will have the longer and the shorter conduction interval, respectively, that is, in which of two possible modes the system is operating.

Figure 7:
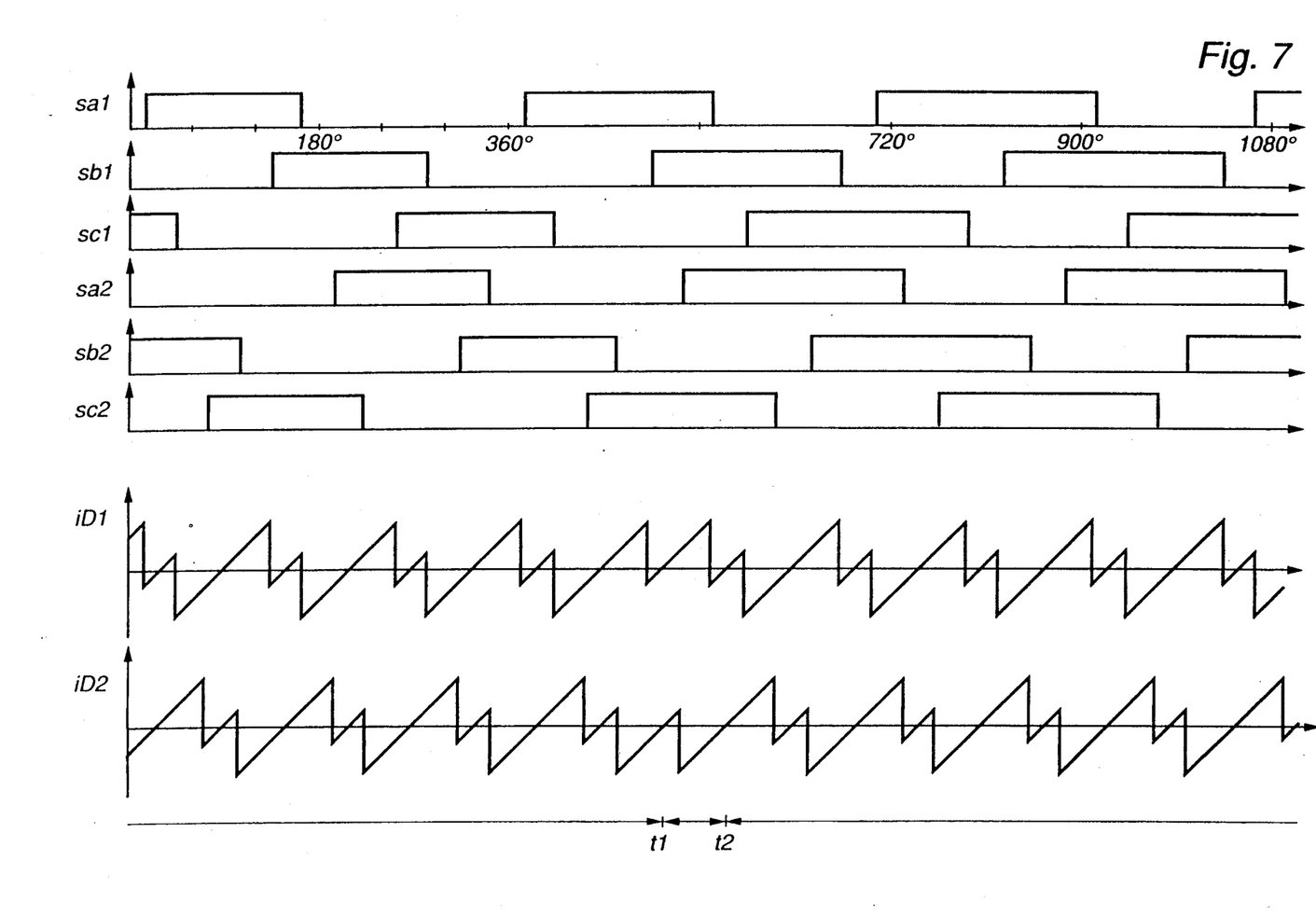

In one embodiment of the invention, a change of the mode in which the convertors are operating is periodically performed. This can be carried out by a control of the convertors in accordance with the diagrams in FIG. 7. Briefly, the control strategy means that one of the recurrent sign changes in SA is canceled. In FIG. 7 the system operates in a first mode prior to $t = t1$. At $t = t1$, a mode change is initiated, which is completed at $t = t2$, whereafter the system operates in its second mode.

Figure 8:
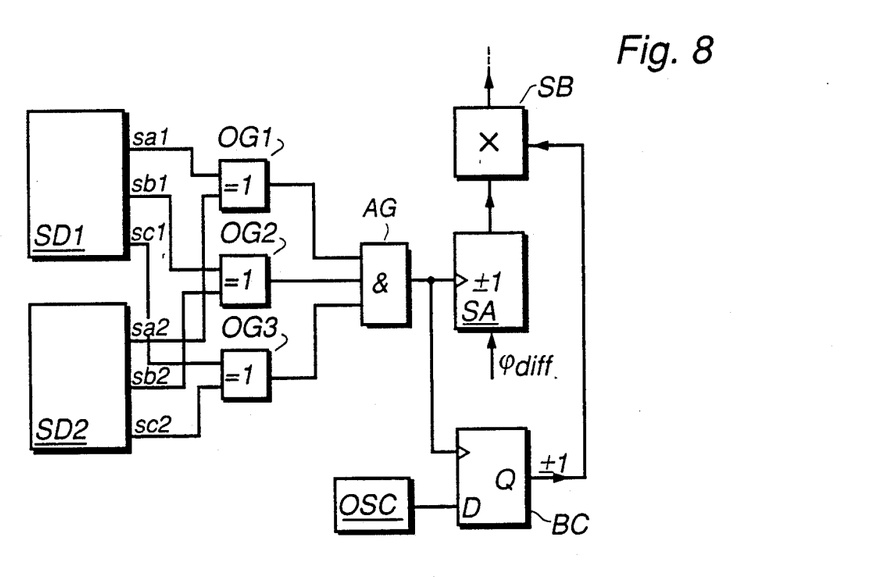
FIG. 8 shows how the control system shown in FIGS. 5a and 5b may be modified to provide the function shown in FIG. 7.

By periodically changing operating mode in this way, each individual convertor valve will alternately belong to the valve group which operates with long conduction intervals and to that which operates with short conduction intervals. If the period for the change of mode thus carried out is short or comparable with the thermal time constant of the valve, the temperature increase caused by the losses will be equally great in all the valves of the convertor. These may then be utilized in an economically optimum way. The change of mode may take place as often as upon every other commutation, that is, the sign reversal sequence will then be
$+ + - - + + - - + + - - \ldots$ FIG. 8 shows a device for carrying out the change of mode in the manner described above. The device comprises an extra sign reverser SB in the form of a multiplier, which sign-reverses the output signal from the sign reverser SA (cf. FIG. 5b). The multiplier is controlled by the output signal from a bistable circuit BC.

This has a preparatory D-input which is controlled by an oscillator OSC which provides a square wave with lower frequency that the commutating frequency of the convertor. Upon that commutation which follows immediately after each change of state of the output signal of the oscillator, the output signal of the circuit BC will change signs, which means that the system changes working mode.

Instead of being controlled by the free-swinging oscillator shown in FIG. 8, the mode change may be controlled in some other way, for example in dependence on some measured system quantity, for example the temperature of the semiconductor elements.

Figure 9:
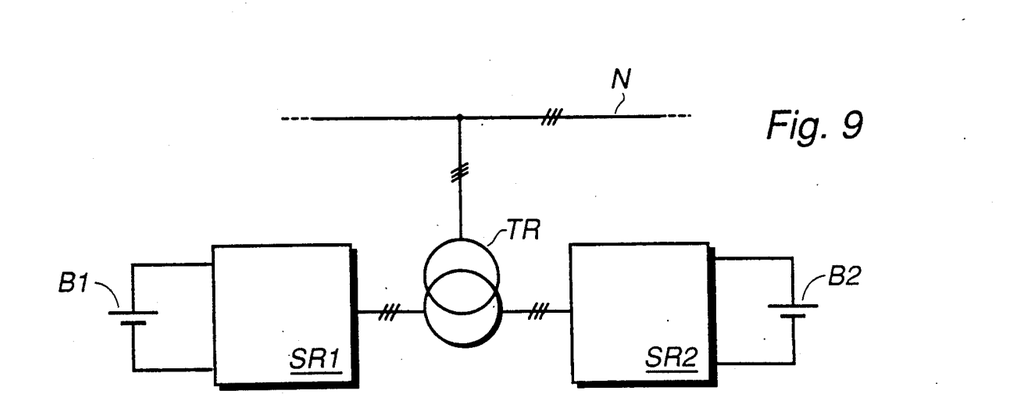
FIG. 9 schematically shows how a convertor according to the invention may alternatively be used to equalize peak loads in an alternating voltage network by energy storage.

FIG. 9 shows an alternative use of a convertor according to the invention. The direct voltage sources of the two partial convertors here consist of accumulator batteries B1 and B2. At low load in the network N, the convertor is controlled such that active power flows from the network into the accumulator batteries where it is stored. At high load, the convertor is controlled such that active power flows from the batteries out into the network. In this way, the load of the network may be equalized in a manner known per se. The control and function of the convertor may, in principle, be the same as has been described above with reference to FIGS. 3–8; however, the control circuits for control of the individual capacitor voltages of course being replaced by control circuits which control the current through each of the accumulator batteries. The individual control then ensures that the mean current through each battery becomes equal to the common reference obtained from the superordinate control. In the same way, the control circuit shown in FIG. 5 is suitably supplemented by members for control of the active power flux by common phase advance and phase retardation, respectively, of the two partial convertors.

The embodiments and uses described above are only examples and both other embodiments and other fields of use are feasible within the scope of the invention. Thus, the principle of the invention is described for six-pulse convertors, the output voltages of which are combined so as to obtain a twelve-pulse voltage, but the principle according to the invention may be used also for other pulse numbers than those mentioned above. The above-described value of the signal $\phi$diff, which gives a mutual phase displacement of 150° between the two partial convertors, gives the lowest harmonic content, but also other values of the phase displacement between the two partial convertors may be used. In a manner known per se, in a convertor according to the invention one or more extra commutations may be performed every half-period to further reduce the harmonic content of the output voltage. The control methods described above are only examples.

A further reduction of the harmonic content of the generated a.c. voltage can be obtained by arranging two convertors according to the invention in a multipulse connection. Each convertor may be of the type described above in connection with FIGS. 3–8. The transformer of a first one of the two convertors has its network winding D-connected. The second one of the convertors has a transformer, the network winding of which is an open winding, with each phase winding being connected between a terminal of the D-connected network winding of the first convertor and the a.c. line. In this case, each convertor works with a phase difference ($\phi$diff) of 15°. The two convertors operate with a mutual phase difference of 30°. The resulting a.c. voltage generated by this arrangement is close to an ideal 24-pulse voltage.

As will be clear from the foregoing description, according to the invention a convertor is obtained in which, with low commutating frequency and hence low losses, a low harmonic content may be obtained. No zero-sequence voltages or circulating currents arise and therefore no special inductors or special transformer embodiments are required to eliminate such problems. Both the main circuits of the partial convertors and the transformer have a configuration which is as simple and economical as possible. Therefore, a convertor according to the invention is simple and economically favorable.

I claim:

1. A three-phase voltage stiff convertor comprising a first and a second six-pulse convertor, each partial convertor having alternating voltage terminals and direct voltage terminals in which the partial convertors operate phase-displaced in relation to each other, the alternating voltage terminals of the partial convertors are connected to a transformer for forming the alternating voltages of the convertor by combination of the alternating voltages of the partial convertors, and the direct voltage terminals of each partial convertor are connected to a direct voltage source wherein the convertor has two separate direct voltage sources, each one connected to the direct voltage terminals of one of the partial convertors, and wherein the convertor is provided with control members adapted to control the partial converters such that the phase displacement between the two partial convertors constantly alternates between positive and negative values.

2. A convertor according to claim 1, wherein the control members are adapted to control the partial convertors such that the means value of the phase displacement between them is zero.

3. A convertor according to claim 1, wherein the control members are adapted to control the partial convertors such that the phase displacement between them alternates between a positive value of an equally great negative value.

4. A convertor according to claim 1, wherein the partial convertors are six-pulse convertors and wherein the control members are adapted to control the partial convertors such that the phase displacement between them alternates between two values which are substantially equal to $+150°$ and $-150°$.

5. A convertor according to claim 1, wherein the control members are adapted to control the partial convertors such that the phase displacement between them periodically alternates between said two values.

6. A convertor according to claim 5, wherein the control members are adapted to control the partial convertors such that the phase displacement between them changes sign each time the control vector in one of the partial convertors is the inverse of the control vector in the other partial convertor.

7. A convertor according to claim 6, wherein the control members comprise members for suppressing occasional sign reversals for achieving a change of the operating mode of the system.

8. A convertor according to claim 7, wherein the control members comprise members for suppressing occasional sign reversals with a frequency which is lower than the commutating frequency of each partial convertor.

9. A convertor according to claim 1 for connection to an alternating voltage network and for delivering a positive or negative reactive power to the network, wherein the direct voltage sources consist of capacitor banks.

10. A convertor according to claim 9, wherein it is provided with members for control the capacitor voltages in dependence on the flux of reactive power between the convertor and the network by influencing the phase position of the partial convertors relative to the line voltage.

11. A convertor according to claim 1, wherein the transformer has an open convertor winding with three-phase windings, each phase winding having one of its end points connected to an alternating voltage terminal of one of the partial convertors and its other end point connected to the corresponding alternating voltage terminal of the other partial convertor.

12. A convertor according to claim 11, wherein the transformer has a star-connected network winding with a terminal for grounding the winding.

13. A convertor according to claim 2 wherein the control members are adapted to control the partial convertors such that the phase displacement between them alternates between a positive value and an equally great negative value.

14. A convertor according to claim 3 wherein the partial convertors are six-pulse convertors and wherein the control members are adapted to control the partial convertors such that the phase displacement between them alternates between two values which are substantially equal to $+150°$ and $-150°$.

15. A convertor according to claim 4, wherein the control members are adapted to control the partial convertors such that the phase displacement between them periodically alternates between said two values.

16. A convertor according to claim 8, for connection to an alternating voltage network and for delivering a positive or negative reactive power to the network, wherein the direct voltage sources consist of capacitor banks.

17. A convertor according to claim 10, wherein the transformer has an open convertor winding with three-phase windings, each phase winding having one of its end points connected to an alternating voltage terminal of one of the partial convertors and its other end point connected to the corresponding alternating voltage terminal of the other partial convertor.

* * * * *